United States Patent
Nakamura et al.

(10) Patent No.: US 12,247,302 B2
(45) Date of Patent: Mar. 11, 2025

(54) MANGANESE-IRIDIUM COMPOSITE OXIDE FOR WATER SPLITTING CATALYST, MANGANESE-IRIDIUM COMPOSITE OXIDE ELECTRODE MATERIAL, AND THEIR PRODUCTION METHODS

(71) Applicants: RIKEN, Saitama (JP); TOSOH CORPORATION, Yamaguchi (JP)

(72) Inventors: Ryuhei Nakamura, Saitama (JP); Nadege Bonnet, Saitama (JP); Shuang Kong, Saitama (JP); Kazumasa Suetsugu, Yamaguchi (JP)

(73) Assignees: RIKEN, Saitama (JP); TOSOH CORPORATION, Yamaguchi (JP)

( * ) Notice: Subject to any disclaimer, the term of this patent is extended or adjusted under 35 U.S.C. 154(b) by 306 days.

(21) Appl. No.: 17/912,686

(22) PCT Filed: Mar. 19, 2021

(86) PCT No.: PCT/JP2021/011501
§ 371 (c)(1),
(2) Date: Sep. 19, 2022

(87) PCT Pub. No.: WO2021/193467
PCT Pub. Date: Sep. 30, 2021

(65) Prior Publication Data
US 2023/0175152 A1    Jun. 8, 2023

(30) Foreign Application Priority Data
Mar. 25, 2020 (JP) .................. 2020-054589

(51) Int. Cl.
*C25B 11/075* (2021.01)
*C01G 55/00* (2006.01)
(Continued)

(52) U.S. Cl.
CPC .......... *C25B 11/075* (2021.01); *C01G 55/002* (2013.01); *C25B 1/04* (2013.01);
(Continued)

(58) Field of Classification Search
CPC ........... C25B 11/075; C25B 1/04; C25B 9/23; C25B 11/052; C25B 11/056;
(Continued)

(56) References Cited

U.S. PATENT DOCUMENTS

2021/0123151 A1    4/2021  Nakamura et al.

FOREIGN PATENT DOCUMENTS

JP         8-269761 A      10/1996
JP      2007-514520 A       6/2007
(Continued)

OTHER PUBLICATIONS

Trasatti, S. et al., "Ruthenium dioxide: a new interesting electrode material. Solid state structure and electrochemical behaviour", J. Electroanal. Chem., 1971, 29, App.1-5.
(Continued)

*Primary Examiner* — Wayne A Langel
*Assistant Examiner* — Syed T Iqbal
(74) *Attorney, Agent, or Firm* — GREENBLUM & BERNSTEIN, P.L.C.

(57) ABSTRACT

To provide a manganese-iridium composite oxide, a manganese-iridium composite oxide and a manganese-iridium composite oxide electrode material, having high catalytic activity produced at low cost, to be used as an anode catalyst for oxygen evolution in water electrolysis, and their production methods.

A manganese-iridium composite oxide, which has an iridium metal content ratio (iridium/(manganese+iridium)) of 0.1 atomic % or more and 30 atomic % or less, and has interplanar spacings of at least 0.243±0.002 nm,
(Continued)

0.214±0.002 nm, 0.165±0.002 nm, 0.140±0.002 nm, and a manganese-iridium composite oxide electrode material comprising an electrically conductive substrate constituted by fibers at least part of which are covered with the above manganese-iridium composite oxide.

15 Claims, 10 Drawing Sheets

(51) Int. Cl.
    *C25B 1/04*     (2021.01)
    *C25B 9/23*     (2021.01)
    *C25B 11/052*     (2021.01)
    *C25B 11/056*     (2021.01)
    *C25B 11/063*     (2021.01)
    *C25B 11/065*     (2021.01)
    *C25D 9/08*     (2006.01)

(52) U.S. Cl.
    CPC .............. *C25B 9/23* (2021.01); *C25B 11/052* (2021.01); *C25B 11/056* (2021.01); *C25B 11/063* (2021.01); *C25B 11/065* (2021.01); *C25D 9/08* (2013.01); *C01P 2002/52* (2013.01); *C01P 2002/72* (2013.01); *C01P 2002/77* (2013.01); *C01P 2004/03* (2013.01); *C01P 2006/40* (2013.01)

(58) Field of Classification Search
    CPC ... C25B 11/063; C25B 11/065; C25B 11/093; C01G 55/002; C01G 45/02; C25D 9/08; C01P 2002/52; C01P 2002/72; C01P 2002/77; C01P 2004/03; C01P 2006/40; Y02E 60/36
See application file for complete search history.

(56) References Cited

FOREIGN PATENT DOCUMENTS

JP     2015-192993 A     11/2015
WO     2009/154753 A2     12/2009
WO     WO-2019117199 A1 *     6/2019   ............. C01G 45/02

OTHER PUBLICATIONS

Harriman, A. et al., "Metal Oxides as Heterogeneous Catalysts for Oxygen Evolution under Photochemical Conditions", J. Chem. Soc., Faraday Trans. 1, 84, 1988, pp. 2795-2806.

Zhao, Y. et al., "Anodic Deposition of Colloidal Iridium Oxide Thin Films from Hexahydroxyiridate(IV) Solutions", Small, 7, 2011, No. 14, pp. 2087-2093.

Najafpour, M. et al., "Manganese Compounds as Water-Oxidizing Catalysts: From the Natural Water-Oxidizing Complex to Nanosized Manganese Oxide Structures", Chem. Rev., 116, 2016, pp. 2886-2936.

Takashima, T. et al., "Detection of Intermediate Species in Oxygen Evolution on Hematite Electrodes Using Spectroelectrochemical Measurements", J. Phys. Chem. C, 120, 2016, pp. A-H.

Gerken, J. et al., "Electrochemical Water Oxidation with Cobalt-Based Electrocatalysts from pH 0-14: The Thermodynamic Basis for Catalyst Structure, Stability, and Activity", J. Am. Chem. Soc., 113, 2011, pp. 14431-14442.

Dinca, M. et al., "Nickel-borate oxygen-evolving catalyst that functions under benign conditions", Proc. Natl. Acad. Sci. U.S.A., 107, 2010, pp. 10337-10341.

International Search Report and Written Opinion of the International Searching Authority issued in International Patent Application No. PCT/JP2021/011501, dated May 25, 2021, along with an English translation thereof.

International Preliminary Report on Patentability in International Patent Application No. PCT/JP2021/011501, dated Sep. 22, 2022, along with an English translation thereof.

* cited by examiner

MANGANESE-IRIDIUM COMPOSITE OXIDE FOR WATER SPLITTING CATALYST, MANGANESE-IRIDIUM COMPOSITE OXIDE ELECTRODE MATERIAL, AND THEIR PRODUCTION METHODS

TECHNICAL FIELD

The present invention relates to a manganese-iridium composite oxide for a water splitting catalyst, a manganese-iridium composite oxide electrode material, and their production methods and their applications. More particularly, the present invention relates to a manganese-iridium composite oxide and a manganese-iridium composite oxide electrode material, used as an anode catalyst for oxygen evolution in industrial water electrolysis conducted under alkaline conditions, under neutral conditions or under acidic conditions, or in water electrolysis using a polymer electrolyte membrane (PEM) type electrolytic cell, and their production methods.

BACKGROUND ART

From the viewpoint of depletion of fossil fuel and environmental pollution, utilization of hydrogen as a clean energy and its production process have attracted attention. Water electrolysis method is one of useful means to produce high purity hydrogen gas from a cathode by electrolyzing water and is characterized by oxygen evolution from an anode as the counter electrode at the same time. In order that the water splitting reaction efficiently proceeds in the water electrolysis method, it is necessary to conduct electrolysis while the electrolysis voltage applied through the electrolysis is kept low, using an electrode catalyst with a low hydrogen overvoltage for the cathode and an electrode catalyst with a low oxygen overvoltage for the anode. As an electrode catalyst material capable of providing excellent low oxygen overvoltage for the anode, compounds represented by rare platinum group metals such as platinum (Pt), iridium (Ir) and ruthenium (Ru), and oxides containing such elements, have been proposed (Patent Documents 1 and 2, Non-Patent Documents 1 to 3).

On the other hand, since an electrode catalyst constituted by such a platinum group metal is very expensive, development of an electrode catalyst using an inexpensive transition metal has been in progress. For example, in recent years, transition metal materials constituted by manganese (Mn), iron (Fe), cobalt (Co) or nickel (Ni) have been proposed (Patent Documents 3 and 4, Non-Patent Documents 4 to 7).

However, the catalyst materials constituted by transition metals proposed are problematic in that their activity is very low (the oxygen overvoltage is high) as compared with platinum group metal type electrode catalysts. That is, an oxygen evolution electrode catalyst material which is constituted by an inexpensive transition metal and which has a high catalytic activity comparable to platinum group metals such as Pt and Ir has not yet been realized.

To solve such problems, a manganese oxide having oxygen evolution electrode catalytic activity equal to or greater than Pt has been found, but it does not achieve the activity comparable to Ir catalysts which are considered to have highest activity among platinum metal elements, and thus further development has been desired (Patent Document 5).

PRIOR ART DOCUMENTS

Patent Documents

Patent Document 1: JP-A-H08-269761
Patent Document 2: JP-A-2007-514520
Patent Document 3: JP-A-2015-192993
Patent Document 4: WO2009/154753
Patent Document 5: WO2019/117199

Non-Patent Documents

Non-Patent Document 1: S. Trasatti, G. Buzzanca, J. Electroanal. Chem., 1971, 29, A1.
Non-Patent Document 2: A. Harriman, I. J. Pickering, J. M. Thomas, P. A. Christensen, J. Chem. Soc., Faraday Trans. 1, 1988, 84, 2795.
Non-Patent Document 3: Y. Zhao, N. M. Vargas-Barbosa, E. A. Hernandez-Pagan, T. E. Mallouk, Small, 2011, 7, 2087.
Non-Patent Document 4: M. M. Najafpour, G. Renger, M. Holynska, A. N. Moghaddam, E.-M. Aro, R. Carpentier, H. Nishihara, J. J. Eaton-Rye, J.-R. Shen, S. I. Allakhverdiev, Chem. Rev., 2016, 116, 2886.
Non-Patent Document 5: T. Takashima, K. Ishikawa, H. Irie, J. Phys. Chem. C, 2016, 120, 24827.
Non-Patent Document 6: J. B. Gerken, J. G. McAlpin, J. Y. C. Chen, M. L. Rigsby, W. H. Casey, R. D. Britt, S. S. Stahl, J. Am. Chem. Soc., 2011, 133, 14431.
Non-Patent Document 7: M. Dinca, Y. Surendranath, D. G. Nocera, Proc. Natl. Acad. Sci. U.S.A., 2010, 107, 10337.

DISCLOSURE OF INVENTION

Technical Problem

The object of the present invention is to provide a manganese-iridium composite oxide for a water splitting catalyst, a manganese-iridium composite oxide electrode material, and their production methods.

More particularly, it is to provide a manganese-iridium composite oxide for a water splitting catalyst (hereinafter sometimes referred to as the manganese-iridium composite oxide of the present invention) which is used as an anode catalyst material for oxygen evolution in industrial water electrolysis conducted under alkaline conditions, under neutral conditions or under acidic conditions or in water electrolysis using a polymer electrolyte membrane (PEM) type electrolytic cell, which is available at a low cost and which has high oxygen evolution catalytic activity, a manganese-iridium composite oxide electrode material for a water splitting catalyst, and their production methods.

Solution to Problem

The present inventors have conducted extensive studies on catalyst materials used as an oxygen evolution electrode catalyst in water electrolysis and as a result, found that a manganese-iridium composite oxide, which has an iridium metal content ratio (iridium/(manganese+iridium)) of 0.1 atomic % or more and 30 atomic % or less, and has interplanar spacings of at least $0.243\pm0.002$ nm, $0.214\pm0.002$ nm, $0.165\pm0.002$ nm and $0.140\pm0.002$ nm, has high oxygen evolution electrode catalytic activity, and accomplished the present invention. That is, the present invention provides a manganese-iridium composite oxide for an oxygen evolution electrode catalyst in water electrolysis, which has an iridium metal content ratio (iridium/

(manganese+iridium)) of 0.1 atomic % or more and 30 atomic % or less, and has interplanar spacings of at least 0.243±0.002 nm, 0.214±0.002 nm, 0.165±0.002 nm and 0.140±0.002 nm.

The present inventors have further found that a manganese-iridium composite oxide electrode material comprising fibers of an electrically conductive substrate, at least part of which are covered with the manganese-iridium composite oxide of the present invention, has particularly high oxygen evolution electrode catalytic activity. That is, the present invention provides a manganese-iridium composite oxide electrode material for an oxygen evolution electrode, which comprises an electrically conductive substrate constituted by fibers at least part of which are covered with the manganese-iridium composite oxide of the present invention.

Advantageous Effects of Invention

The manganese-iridium composite oxide of the present invention and the manganese-iridium composite oxide electrode material of the present invention have high activity and function as an inexpensive and excellent anode catalyst for oxygen evolution, in industrial water electrolysis conducted under alkaline conditions, under neutral conditions or under acidic conditions, and in water electrolysis using a PEM type electrolytic cell. Further, the manganese-iridium composite oxide and the manganese-iridium composite oxide electrode material of the present invention have very excellent durability as an oxygen evolution electrode catalyst.

Further, by adding carbon dioxide to the electrolysis system employing the manganese-iridium composite oxide electrode material of the present invention, carbon dioxide is reduced at the cathode, whereby hydrocarbon compounds (such as formic acid, formaldehyde, methanol, methane, ethane and propane) may be produced.

DESCRIPTION OF EMBODIMENTS

Figure 1:
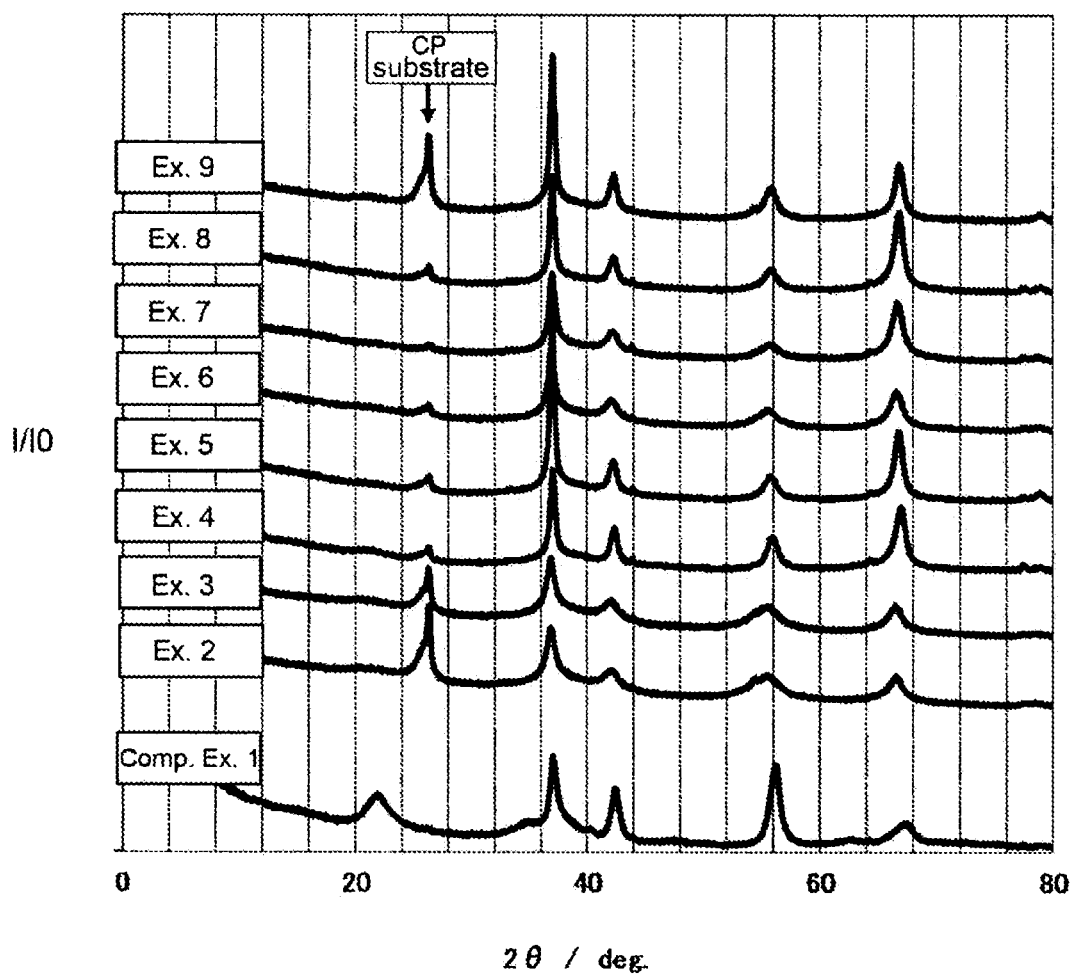
FIG. 1 is XRD patterns of the manganese-iridium composite oxides in Examples 2 to 9 and the manganese oxide in Comparative Example 1.

Now, the present invention will be described in further detail.

First, decomposition of water by electrolysis will be described with reference to a reaction in which the reaction site is in an acidic environment, such as PEM type water electrolysis, as an example. On the cathode catalyst, hydrogen is formed by a reaction of two protons and two electrons as shown in Formula 1.

$$2H^+ + 2e^- \rightarrow H_2 \quad \text{Formula 1}$$

On the other hand, on the anode catalyst, oxygen is formed together with four electrons and four protons from two water molecules, as shown in Formula 2.

$$2H_2O \rightarrow O_2 + 4H^+ + 4e^- \quad \text{Formula 2}$$

And, as a whole, a reaction by which two hydrogen molecules and one oxygen molecule are formed from two water molecules occurs, as shown in Formula 3.

$$2H_2O \rightarrow 2H_2 + O_2 \quad \text{Formula 3}$$

The oxygen evolution reaction in the Formula 2 is generally considered as the rate-determining step in the whole reaction, and development of a catalyst which can promote the reaction with a minimum energy is considered to be important in this technical field. The present invention is to provide an oxygen evolution electrode catalyst which has high water splitting catalytic performance.

The manganese-iridium composite oxide of the present invention has an iridium metal content ratio (iridium/(manganese+iridium)) controlled to be 0.1 atomic % or more and 30 atomic % or less. If the iridium metal content ratio is less than 0.1 atomic %, its properties will be at a level of those of manganese oxide single catalyst, and if the iridium metal content ratio is higher than 30 atomic %, catalytic activity at a level of that of an iridium oxide will be achieved, however, since a rare element iridium is used in a large amount, the composite oxide will be very expensive, thus impairing the economical efficiency. In order to achieve excellent properties, the iridium metal content ratio is preferably 0.2 atomic % or more and 27 atomic % or less, more preferably 0.2 atomic % or more and 20 atomic % or less, further preferably 0.3 atomic % or more and 10.5 atomic % or less, particularly preferably 1 atomic % or more and 7 atomic % or less.

The XRD of the manganese-iridium composite oxide of the present invention has characteristic diffraction lines. The diffraction pattern has, in order from the low angle side, at least diffraction lines which provide d representing the interplanar spacings of 0.243±0.002 nm, 0.214±0.002 nm, 0.165±0.002 nm and 0.140±0.002 nm.

A manganese-iridium composite oxide having such interplanar spacings has not been reported yet, and the manganese-iridium composite oxide of the present invention shows X-ray diffraction patterns similar to those of ε-manganese dioxide containing a large amount of structural faults by formation of microtwins.

By making the manganese-iridium composite oxide of the present invention be supported on the electrode, the manganese-iridium composite oxide of the present invention functions as the oxygen evolution electrode active material in water electrolysis and can impart the catalytic performance for the water splitting reaction to the oxygen evolution electrode. By laminating the oxygen evolution electrode containing the oxygen evolution electrode active material, a polymer electrolyte membrane and an electrode having a hydrogen evolution catalyst, a laminate is obtained. The polymer electrolyte membrane may, for example, be a fluororesin type cation exchange membrane, and the hydrogen evolution catalyst may, for example, be platinum fine particles. In the present invention, by the oxygen evolution electrode, a water electrolysis apparatus can be constituted, and by water electrolysis using the oxygen evolution electrode, hydrogen can be produced.

Now, the method for producing the manganese-iridium composite oxide of the present invention will be described.

The manganese-iridium composite oxide of the present invention may be produced by electrodeposition, for example, using as an electrolytic solution a sulfuric acid/manganese sulfate/iridium salt mixed solution. Otherwise, it may be produced by electrodepositing a manganese oxide using a sulfuric acid/manganese sulfate mixed solution and then electrodepositing an iridium oxide on the manganese oxide using a sulfuric acid/iridium salt mixed solution.

With respect to the concentrations of the components in the sulfuric acid/manganese sulfate/iridium salt mixed solution, the sulfuric acid/manganese sulfate mixed solution and the sulfuric acid/iridium salt mixed solution, the sulfuric acid concentration is adjusted to be preferably higher than 4 g/L and 65 g/L or less, more preferably 20 g/L or more and 50 g/L or less.

The manganese concentration of the mixed solution is not particularly limited so long as it is the solubility or less, and is preferably 5 g/L or more and 50 g/L or less, more preferably 10 g/L or more and 30 g/L or less. The iridium concentration of the mixed solution is also not particularly limited so long as it is the solubility or less, and is preferably 0.1 g/L or more and 10 g/L or less, more preferably 0.3 g/L or more and 5 g/L or less. The ratio of the iridium concentration to the manganese concentration in the mixed solution influences the metal composition of the manganese-iridium composite oxide deposited by electrolytic oxidation, and thus it is preferably 0.002 or more and 0.05 or less, more preferably 0.005 or more and 0.02 or less, by the iridium/manganese molar ratio of the mixed solution.

To maintain the concentrations of the components in the mixed solution, it is effective to properly add manganese sulfate and an iridium salt corresponding to the manganese and the iridium consumed by electrolytic oxidation, or to continuously supply solutions of manganese sulfate and an iridium salt or their mixed solution.

The sulfuric acid concentration in the sulfuric acid/manganese sulfate/iridium salt mixed solution, the sulfuric acid/manganese sulfate mixed solution and the sulfuric acid/iridium salt mixed solution, is a value excluding bivalent anions (sulfate ions) of the manganese sulfate.

In the method for producing the manganese-iridium composite oxide by electrolysis, the electrolysis current density is not particularly limited and is preferably 0.2 A/dm$^2$ or more and 0.9 A/dm$^2$ or less, whereby the manganese-iridium composite oxide of the present invention can readily be produced by electrolysis efficiently and stably. In order to obtain the manganese-iridium composite oxide of the present invention more stably, the electrolysis current density is more preferably 0.3 A/dm$^2$ or more and 0.88 A/dm$^2$ or less, further preferably 0.5 A/dm$^2$ or more and 0.8 A/dm$^2$ or less.

The electrolysis temperature may, for example, be 93° C. or more and 98° C. or less. The higher the electrolysis temperature is, the more the efficiency for production of the manganese-iridium composite oxide deposited by electrolysis increases, and accordingly the electrolysis temperature is preferably higher than 94° C.

The manganese-iridium composite oxide formed on an electrode such as a pure titanium plate by electrolysis is separated from the electrode and roughly crushed e.g. by a jaw crusher, and ground and adjusted to have a predetermined average secondary particle size as a manganese-iridium composite oxide simple substance e.g. by a roller mill, a vertical mill, a Loesche mill or a jet mill. Then, the produced manganese oxide is subjected to a washing step and a neutralizing step, to remove the remaining electrolytic solution and then dried e.g. by a flash drying apparatus. At the time of flash drying, a submicron-level manganese-iridium composite oxide fine powder formed as by-product by overgrinding in the grinding step may be recovered and separated by a bag filter of a dust collector. Further, a firing step at a temperature of 200° C. or more and 500° C. or less may be conducted to obtain the manganese-iridium composite oxide of the present invention.

Now, the manganese-iridium composite oxide electrode material of the present invention will be described below.

The manganese-iridium composite oxide electrode material of the present invention comprises an electrically conductive substrate constituted by fibers at least part of which are covered with the manganese-iridium composite oxide of the present invention. In such a case, the amount of the covering manganese-iridium composite oxide of the present invention is, per geometric area of the electrically conductive substrate, preferably 0.1 mg/cm$^2$ or more and 25 mg/cm$^2$ or less. The geometric area corresponds to the projected area of the electrically conductive substrate, and the thickness of the substrate is not considered.

When the amount of the covering manganese-iridium composite oxide of the present invention is within the above range, the fibers can be covered with the manganese oxide in an islands form or substantially the whole outer surface of the fibers can be covered, depending on the diameter and the porosity of the fibers constituting the electrically conductive substrate, and the average covering thickness can be adjusted to be approximately at most 25 μm. Since the manganese-iridium composite oxide covering the fibers is constituted by secondary particles, usually, the average covering thickness and the average secondary particle size of the manganese-iridium composite oxide constituting the covering agree with each other.

In the manganese-iridium composite oxide electrode material of the present invention, in proportion to the amount of the covering manganese-iridium composite oxide, the average thickness of the manganese-iridium composite oxide covering the fibers of the electrically conductive substrate increases. The amount of the covering manganese-iridium composite oxide is preferably 0.1 mg/cm$^2$ or more and 20 mg/cm$^2$ or less, further preferably 0.2 mg/cm$^2$ or more and 15 mg/cm$^2$ or less, particularly preferably 0.5 mg/cm$^2$ or more and 12 mg/cm$^2$ or less. The thickness of the manganese-iridium composite oxide covering layer may be obtained also by, for example, subtracting the diameter of an electrically conductive fiber as a unit constituting the electrically conductive substrate, from a scanning electron microscope (SEM) image.

The manganese-iridium composite oxide electrode material of the present invention may be obtained by electrodepositing a manganese-iridium composite oxide using the above sulfuric acid/manganese sulfate/iridium salt mixed solution, on an electrically conductive substrate represented by carbon paper, titanium mesh or platinum-covered titanium mesh, instead of the electrode substrate of the pure titanium plate. In such a case, the manganese-iridium composite oxide is electrodeposited in a deposition amount of 0.1 mg/cm$^2$ or more and 25 mg/cm$^2$ or less per geometric area. If the deposition amount is less than 0.1 mg/cm$^2$ per geometric area, the deposition amount of the manganese-iridium composite oxide tends to be too small, and the composite oxide may not sufficiently be attached to the substrate and will readily be separated, or the catalyst amount tends to be too small to sufficiently exhibit performance. If it is more than 25 mg/cm$^2$, the manganese-iridium composite oxide covering layer tends to be too thick and electron transfer to the electrically conductive substrate may be impaired, or the gap between the electrically conductive fibers of the electrically conductive substrate tends to be small, and the transfer of water and oxygen which is a reaction product is limited thus becoming the rate-determining step, and thus the catalytic performance may not sufficiently be exhibited.

The electrically conductive substrate is preferably one, for example, obtained by forming or sintering electrically conductive fibers of e.g. carbon or titanium having a diameter of 100 μm or less, into a plate shape having a thickness of 1 mm or less. The porosity of the electrically conductive substrate is, for example, preferably 40% or more, more preferably from 50 to 90%. The porosity is defined by the volume of spaces without electrically conductive fibers and the like in the volume of the electrically conductive substrate.

It is also effective to subject the electrically conductive substrate to an acid treatment with hydrochloric acid, sulfuric acid, nitric acid, oxalic acid or the like before electrodepositing the manganese-iridium composite oxide, so that a passive coating of the substrate surface is removed or the substrate surface is hydrophilized. Further, it is also effective to immerse the electrically conductive substrate in e.g. a dispersion of a fluororesin to impart water repellency, for the purpose of controlling the electrodeposition position of the manganese-iridium composite oxide on the electrically conductive substrate, or of imparting gas diffusion property which is important when practically used as an electrode in water electrolysis.

As conditions when the manganese-iridium composite oxide of the present invention is electrodeposited on the electrically conductive substrate, for example, as mentioned above, electrodeposition may be conducted selecting the respective ranges of the sulfuric acid concentration, the manganese concentration and the iridium concentration of the sulfuric acid/manganese sulfate/iridium salt mixed solution, the sulfuric acid/manganese sulfate mixed solution and the sulfuric acid/iridium salt mixed solution, the electrolysis current density, the electrolysis temperature and the like, for an electrolysis time of from 5 minutes to 120 minutes, and washing with water and drying are conducted after completion of the electrolysis, whereby the manganese-iridium composite oxide electrode material of the present invention is obtained.

By shielding one side of the electrically conductive substrate with e.g. a resin film, at the time of electrodeposition of the manganese-iridium composite oxide, an electrodeposited film of the manganese-iridium composite oxide is preferentially formed only on one side, and the manganese-iridium composite oxide is not substantially electrodeposited on the other side, so that the manganese-iridium composite oxide can be made unevenly electrodeposited on purpose.

Further, it is effective to apply, as the post treatment to the manganese-iridium composite oxide electrode material of the present invention, either one of acid immersion and heating or both of acid immersion and heating. The post treatment by acid immersion is carried out, for example, by immersing the manganese-iridium composite oxide electrode material in a 0.5 mol/L to 5 mol/L sulfuric acid for from 30 minutes to 2 hours, followed by washing with water and drying. Further, the post treatment by heating is carried out, for example, by heating the manganese-iridium composite oxide composite electrode in air or nitrogen atmosphere at from 180° C. to 500° C. for from 30 minutes to 8 hours. Heating may be conducted in air or nitrogen atmosphere at from 180° C. to 300° C. for from 30 minutes to 2 hours, but is conducted preferably in air or nitrogen atmosphere at higher than 300° C. and 500° C. or less for more than 2 hours to 8 hours or less.

It is estimate that by such post treatment, adhesion between the manganese-iridium composite oxide and the electrically conductive fibers improves, or crystallinity of the manganese-iridium composite oxide increases.

By laminating the manganese-iridium composite oxide electrode material of the present invention, a polymer electrolyte membrane and an electrode having a hydrogen evolution catalyst, a laminate is obtained. In the present invention, by the manganese-iridium composite oxide electrode material of the present invention, a water electrolysis apparatus can be constituted, and by water electrolysis using the manganese-iridium composite oxide electrode material, hydrogen can be produced.

EXAMPLES

Now, the present invention will be described in further detail with reference to Examples and Comparative Examples. However, it should be understood that the present invention is by no means restricted thereto.

<Metal Concentration Analysis of Sulfuric Acid/Manganese Sulfate/Iridium Salt Mixed Solution, Sulfuric Acid/Manganese Sulfate Mixed Solution, Sulfuric Acid/Iridium Salt Mixed Solution>

Each of the sulfuric acid/manganese sulfate/iridium salt mixed solution, the sulfuric acid/manganese sulfate mixed solution and the sulfuric acid/iridium salt mixed solution was diluted, and the concentrations of the manganese element and the iridium element were quantitatively determined by ICP-AES (manufactured by PerkinElmer, Optima 8300).

<SEM Surface Observation and Composition Analysis of Manganese-Iridium Composite Oxide and Manganese-Iridium Composite Oxide Electrode Material>

Using a common SEM-EPMA apparatus (S-4500 manufactured by Hitachi Ltd, and EX-250 (EDS) manufactured by HORIBA, Ltd.), the surface state was observed, and elemental analysis (element to be detected: B to U) was conducted. The accelerating voltage was 15 kV.

<Calculation of Interplanar Spacings (d Values) of Manganese-Iridium Composite Oxide and Manganese-Iridium Composite Oxide Electrode Material by XRD Measurement>

Using a common X-ray diffraction apparatus (manufactured by Rigaku Corporation, Ultima IV), diffraction lines of the manganese-iridium composite oxide and the manganese-iridium composite oxide electrode material were measured. As a light source, CuKα rays (λ=1.5405 Å) were employed, the measurement mode was step scanning, the scanning speed was 4.0000° per minute, the step width was 0.02°, and the measurement range was 5° to 80° as 2θ. The diffraction lines of the obtained XRD pattern were subjected to Gaussian treatment to obtain 2θ at the peak top, and d values were obtained in accordance with Bragg' equation (nλ=2d sin θ, n=1) and taken as the interplanar spacings.

<Measurement of Electrodeposition Amount of Manganese-Iridium Composite Oxide>

The electrodeposition amount of the manganese-iridium composite oxide was measured in accordance with the following method.

Before the manganese-iridium composite oxide was electrodeposited, the weight (1) of the substrate (the electrode substrate of e.g. titanium or the electrically conductive substrate) was preliminarily measured by a balance, and after the electrodeposition, the weight (2) of the substrate having the manganese-iridium composite oxide electrodeposited was measured by a balance, and from the difference between the weight (1) and the weight (2) (weight (2)− weight (1)), the electrodeposition amount of the manganese-iridium composite oxide was obtained.

<Constitution of PEM Type Electrolytic Cell for Evaluation of Oxygen Evolution Electrode Catalyst Properties>

Constitution of a PEM type electrolytic cell using an electrode material of the electrically conductive substrate having the manganese-iridium composite oxide catalyst deposited was carried out as follows. Using as a working electrode an electrode material (flat mesh shape: 3 cm×3 cm), and as a catalyst for a counter electrode carbon supported 20 wt % platinum catalyst (20% Platinum on Vulcan XC-72, Item #PTC20-1, Fuel Cell Earth), the counter electrode was prepared by preparing an electrically conductive catalyst ink and applying it to carbon paper, followed by air-drying. As a polymer electrolyte membrane, a Nafion membrane (Nafion 117, manufactured by Sigma-Aldrich) was used. The polymer electrolyte membrane was cleaned and protonated (pre-treatment) by being boiled in 3% hydrogen peroxide aqueous solution, pure water, a 1M sulfuric acid aqueous solution and then pure water each for one hour. Then, the polymer electrolyte membrane was sandwiched between the catalyst-coated surfaces of the working electrode and the counter electrode and hot-pressed using a hot pressing machine (A-010D, manufactured by FC-R&D) at 135° C. with a clamping force of 600 kg for 10 minutes to prepare a membrane/electrolyte assembly (MEA). The MEA had adhesion improved even at the time of electrolysis by means of two sheets of stainless mesh (#100), and was attached to a casing of a PEM type electrolytic cell 1 (3036, manufactured by FC-R&D) or a PEM type electrolytic cell 2 (WE-4S-RICW, manufactured by FC Development Co., Ltd.).

<Electrochemical Measurement 1, Measurement of Current-Voltage Curve (Using PEM Type Electrolytic Cell 1)>

To evaluate the water splitting catalytic performance in an actual device, a current-voltage curve was measured at an operation temperature of 25° C. using a PEM type electrolytic cell 1 constituted by using an electrode material of an electrically conductive substrate having the manganese-iridium composite oxide deposited. In this measurement, two-electrode system using only the working electrode and the counter electrode was employed, and the voltage applied was gradually increased to measure the current-voltage curve. Pure water was supplied to the PEM type electrolytic cell. The voltage increase rate was 5 mV/s so that the voltage at which the current started to increase would readily be distinguished. With respect to the measurement results of the current-voltage curve, a higher current at the same voltage indicates a higher oxygen electrode catalytic activity.

<Electrochemical Measurement 2, Measurement of Current-Voltage Curve (Using PEM Type Electrolytic Cell 2)>

To evaluate the water splitting catalytic performance in an actual device, a current-voltage curve was measured at an operation temperature of 25° C. or 80° C. using a PEM type electrolytic cell 2 constituted by using an electrode material of an electrically conductive substrate having the manganese-iridium composite oxide deposited. In this measurement, two-electrode system using only the working electrode and the counter electrode was employed, and the voltage applied was gradually increased to measure the current-voltage curve. Pure water was supplied to the PEM type electrolytic cell. The voltage increase rate was 5 mV/s so that the voltage at which the current started to increase would readily be distinguished.

<Electrochemical Measurement 3, Measurement of Electrolysis Voltage Stability (Using PEM Type Electrolytic Cell 2)>

To evaluate stability of the water splitting catalytic performance in an actual device, an electrolysis voltage was measured at an operation temperature of 80° C. using a PEM type electrolytic cell 2 constituted by using an electrode material of an electrically conductive substrate having the manganese-iridium composite oxide deposited. In this measurement, two-electrode system using only the working electrode and the counter electrode was employed, and while the current density applied to between the electrodes was maintained at 0.5 A/cm$^2$, a change of the electrolysis voltage with time was measured. Pure water was supplied to the PEM type electrolytic cell. A smaller change of the electrolysis voltage with time indicates a higher performance to keep the oxygen electrode catalytic activity stable, that is so-called durability.

Example 1

Electrolysis was conducted in an electrolytic cell containing a mixed solution of 35 g/L of sulfuric acid, 51.3 g/L of manganese sulfate and 2.0 g/L of potassium hexachloroiridate ($K_2IrCl_6$), to electrodeposit a manganese-iridium composite oxide on a carbon paper (TGP-H-060, manufactured by Toray Industries, Inc.). Electrolysis was conducted at an electrolysis current density of 0.7 A/dm$^2$ at an electrolysis temperature of 95° C. for 60 minutes. After completion of the electrolysis, the carbon paper was washed with water, air-dried and cut into a size of 3 cm×3 cm to prepare an electrode material. The manganese-iridium composite oxide electrode material was subjected to compositional analysis and XRD measurement, and the results are shown in Table 1.

Examples 2 to 12

A mixed solution was prepared and electrolysis was conducted in the same manner as in Example 1 except that the manganese sulfate concentration, the type of the iridium salt, the type of the substrate and the electrolysis temperature were as identified in Table 1, to electrodeposit a manganese-iridium composite oxide on a carbon paper (TGP-H-060, manufactured by Toray Industries, Inc.) or a platinum-covered Ti mesh (ADL-414302-5056, manufactured by FC Development Co., Ltd.). Electrolysis was conducted at an electrolysis current density of 0.7 A/dm$^2$ for 60 minutes. After completion of electrolysis, the carbon paper or the Ti mesh was washed with water, air-dried and cut into a size of 3 cm×3 cm to prepare an electrode material. The obtained manganese-iridium composite oxide electrode materials were subjected to compositional analysis and XRD measurement, and the results are shown in the following Table 1 and FIGS. 1 and 2.

Figure 3:
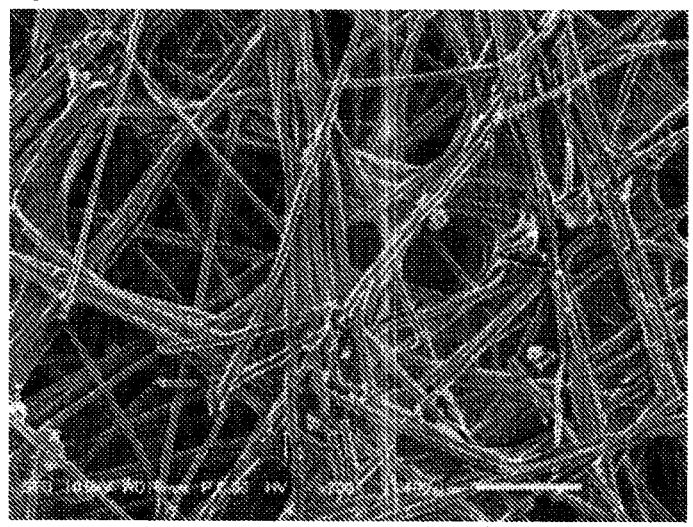
FIG. 3 is a SEM photograph of a carbon paper (CP) substrate.
Figure 4:
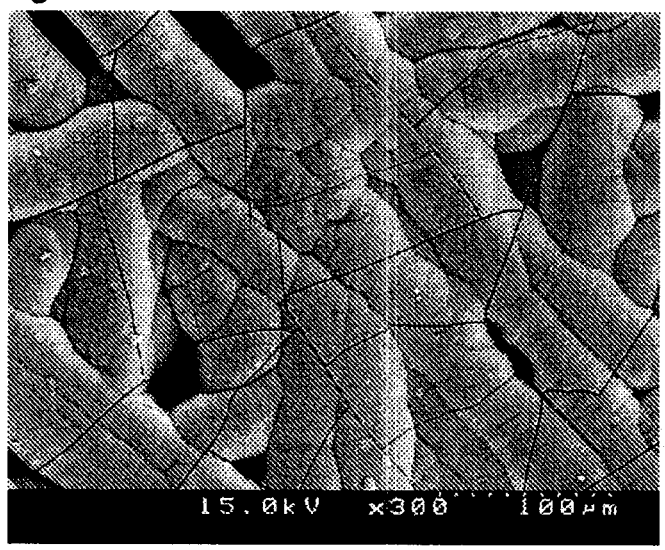
FIG. 4 is a SEM photograph of the manganese-iridium composite oxide deposited on the carbon paper (CP) substrate in Example 12.

As shown in the SEM photograph (FIG. 4) of the outer appearance of the electrode material in Example 12, the manganese-iridium composite oxide covering the carbon fibers (FIG. 3) constituting the carbon paper was confirmed.

Comparative Example 1

Electrolysis was conducted in an electrolytic cell containing a mixed solution of 32 g/L of sulfuric acid and 75 g/L of manganese sulfate, to electrodeposit a manganese oxide on a carbon paper (TGP-H-060, manufactured by Toray Industries, Inc.). Electrolysis was conducted at an electrolysis current density of 0.68 A/dm$^2$ at an electrolysis temperature of 94° C. for 16 minutes. After completion of the electrolysis, the carbon paper was washed with water, air-dried and cut into a size of 3 cm×3 cm to prepare an electrode material. The manganese oxide electrode material was subjected to XRD measurement, and the results are shown in the following Table 1 and FIGS. 1 and 2.

Figure 2:
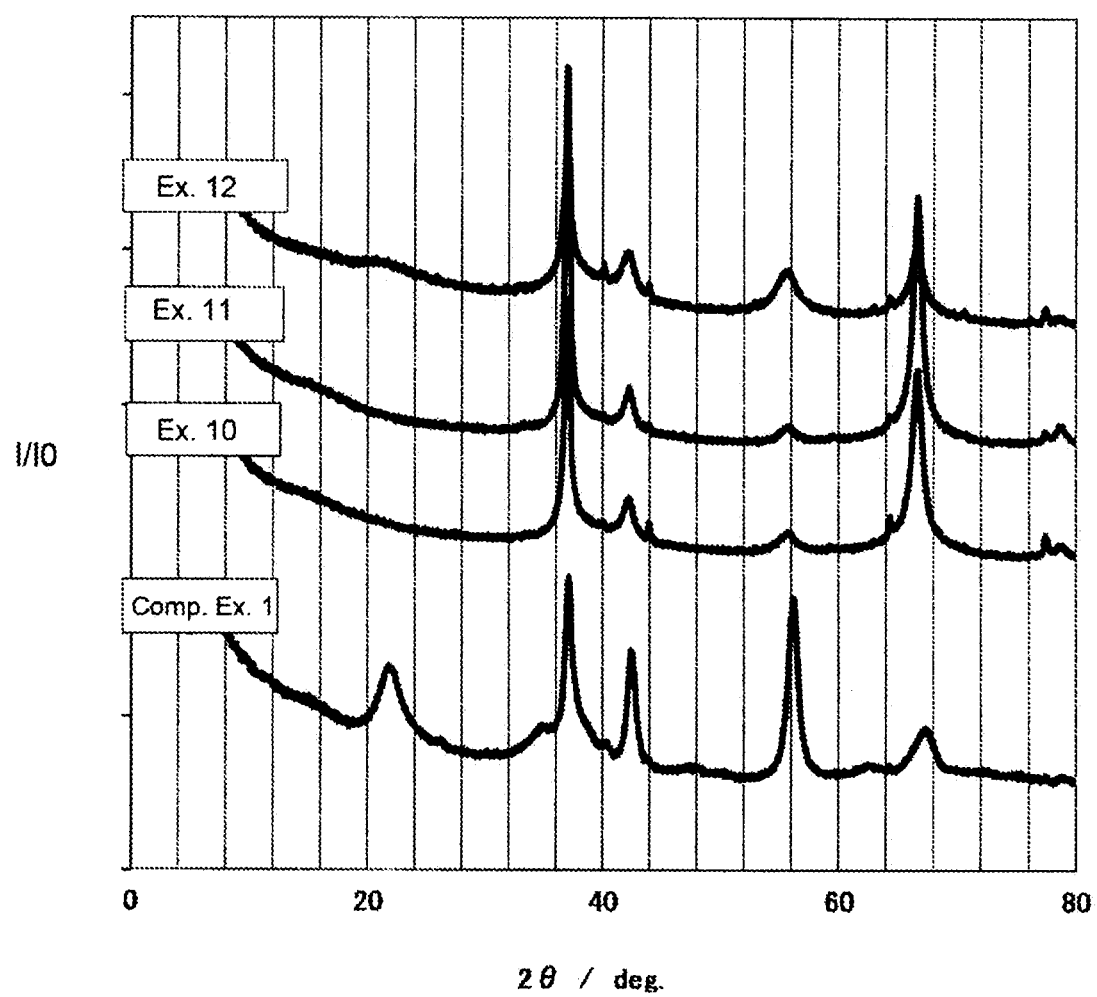
FIG. 2 is XRD patterns of the manganese-iridium composite oxides in Examples 10 to 12 and the manganese oxide in Comparative Example 1.

As shown in FIGS. 1 and 2, the XRD patterns in Examples have substantially no diffraction line at 22 degrees excluding the diffraction line attributable to the carbon paper substrate, as compared with Comparative Example 1, and the other four principal diffraction lines shifted to the lower angle side.

Further, the manganese oxide electrode material in Comparative Example 1 was used to constitute a PEM type electrolytic cell in accordance with <Constitution of PEM type electrolytic cell for evaluation of oxygen evolution electrode catalyst properties>, and the oxygen evolution electrode catalyst properties were evaluated in accordance with <Electrochemical measurement 1, measurement of current-voltage curve (PEM type electrolytic cell)> or <Electrochemical measurement 2, measurement of current-voltage curve (PEM type electrolytic cell 2)>, and the results are shown in the following Table 2 and FIGS. 5 to 9 and FIGS. 12 and 13.

Comparative Example 2

A PEM type electrolytic cell was constituted by using an electrically conductive catalyst ink obtained by mixing a carbon supported 20 wt % platinum catalyst (20% Platinum on Vulcan XC-72, Item #PTC20-1, Fuel Cell Earth) and a diluted Nafion dispersion (10 wt % aqueous solution, 527106-25ML, manufactured by Sigma-Aldrich), and the oxygen evolution electrode catalyst properties were evaluated in accordance with <Electrochemical measurement 1, measurement of current-voltage curve (PEM type electrolytic cell)>. The results are shown in the following Table 2 and FIG. 5.

Comparative Example 3

Figure 5:
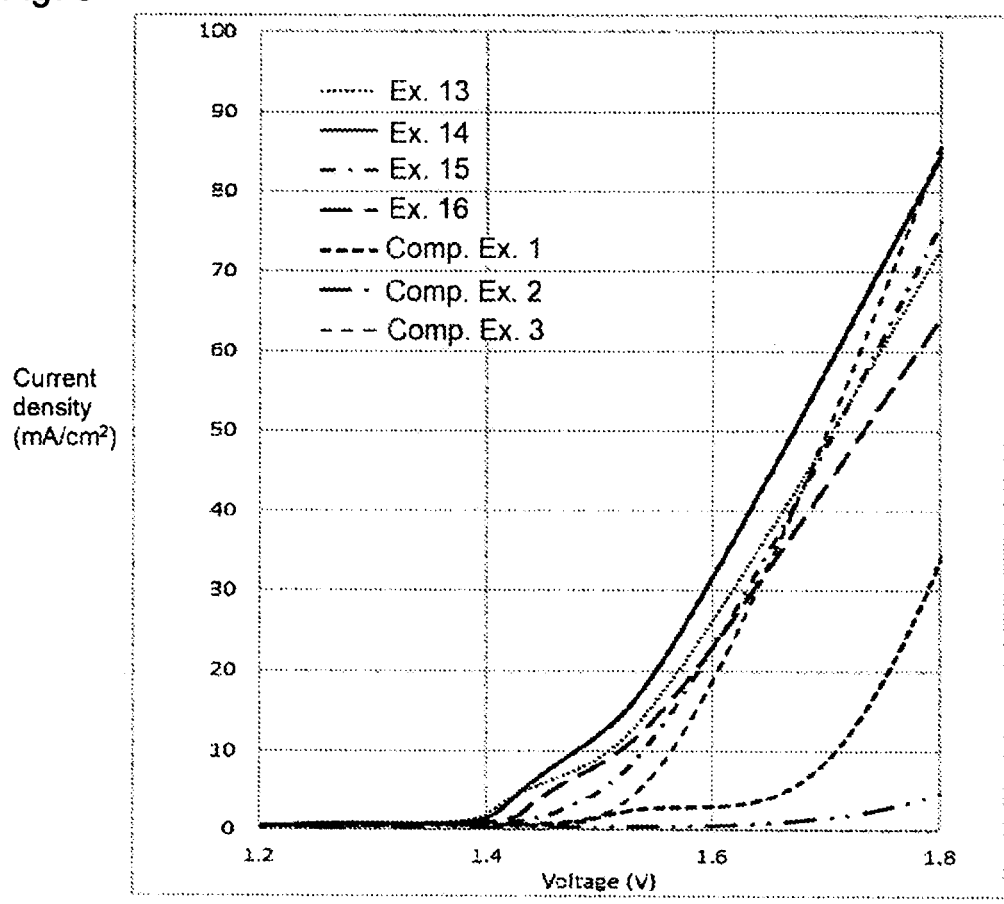
FIG. 5 is linear sweep voltammograms illustrating the relation between the current and the potential (voltage) measured by using <PEM type electrolytic cell 1> at the time of evolution of oxygen (at the time of water electrolysis) in Examples 13 to 16 and Comparative Examples 1 to 3.
Figure 6:
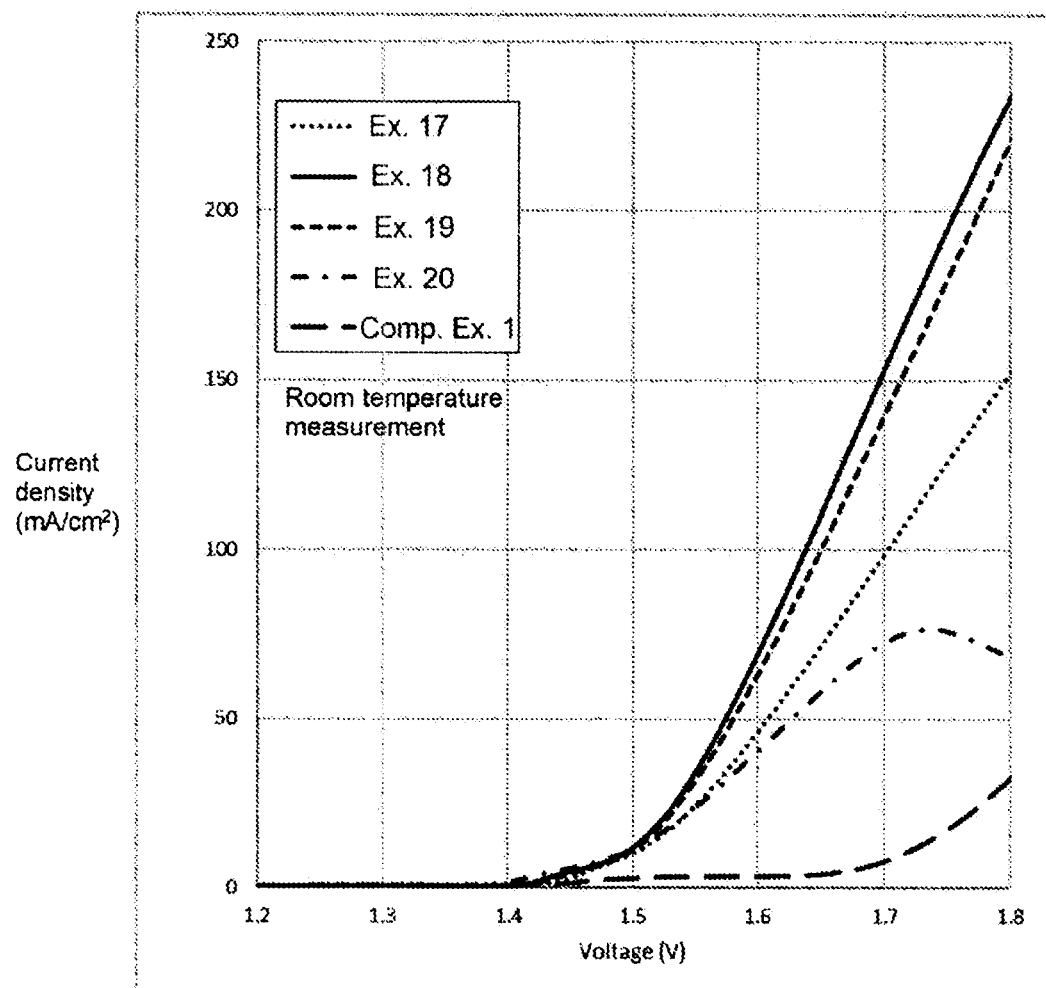
FIG. 6 is linear sweep voltammograms illustrating the relation between the current and the potential (voltage) measured by using <PEM type electrolytic cell 1> at the time of evolution of oxygen (at the time of water electrolysis) in Examples 17 to 20 and Comparative Example 1.
Figure 7:
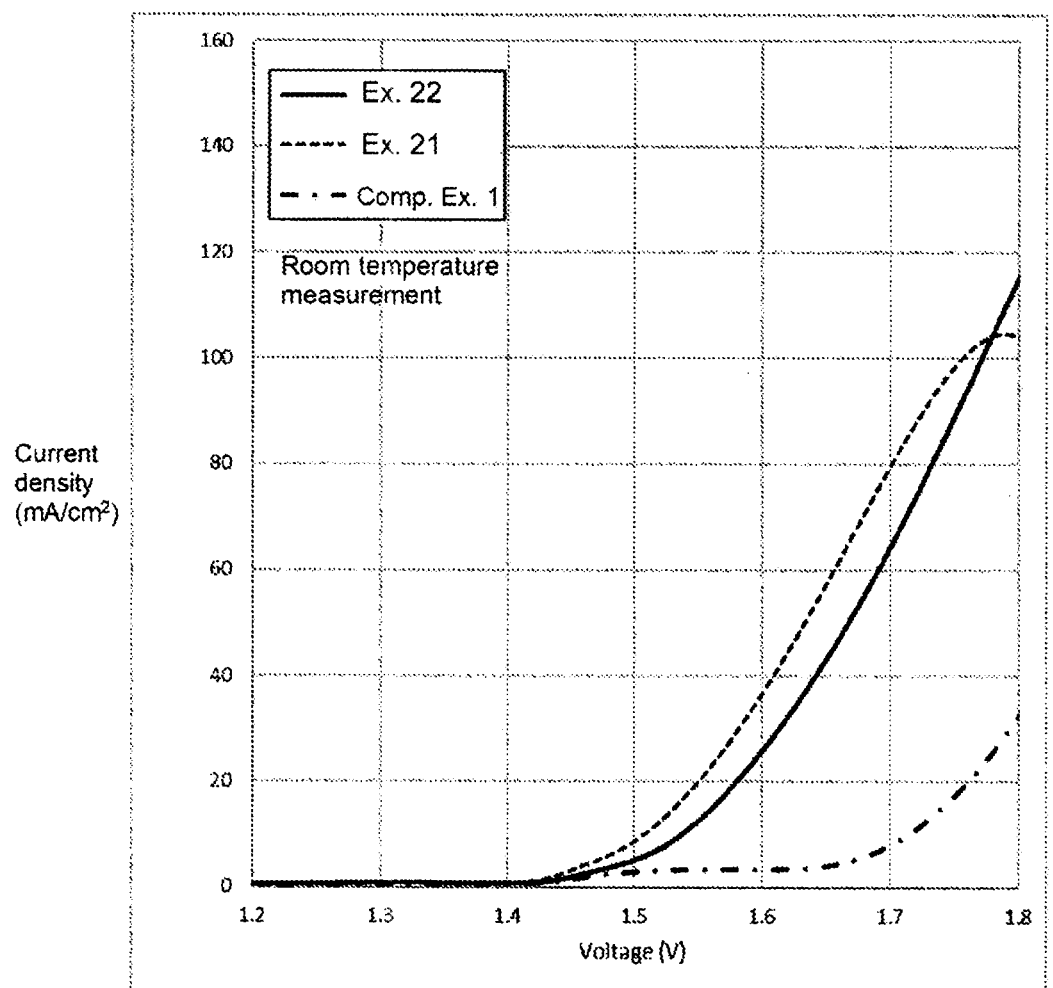
FIG. 7 is linear sweep voltammograms illustrating the relation between the current and the potential (voltage) measured by using <PEM type electrolytic cell 1> at the time of evolution of oxygen (at the time of water electrolysis) in Examples 21 and 22 and Comparative Example 1.
Figure 8:
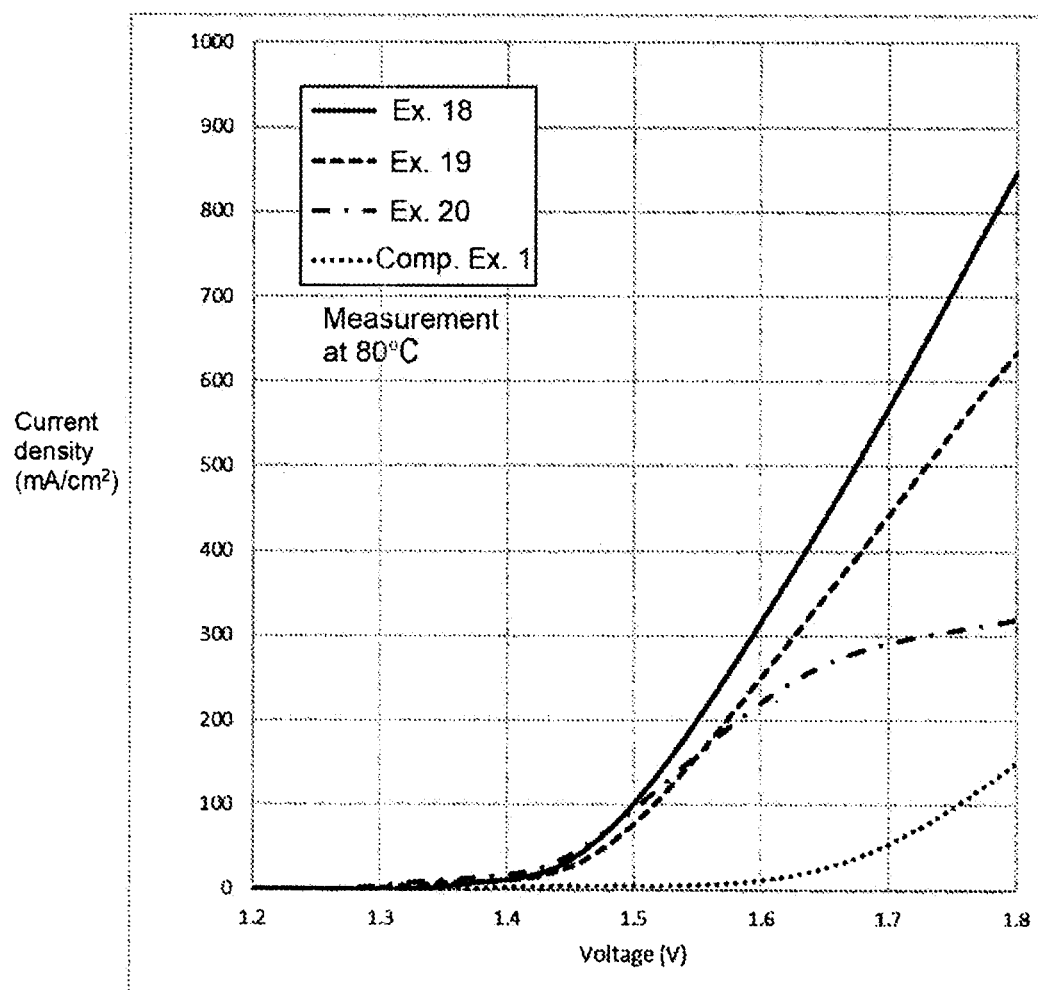
FIG. 8 is linear sweep voltammograms illustrating the relation between the current and the potential (voltage) measured by using <PEM type electrolytic cell 1> at the time of evolution of oxygen (at the time of water electrolysis) in Examples 18 to 20 and Comparative Example 1.
Figure 9:
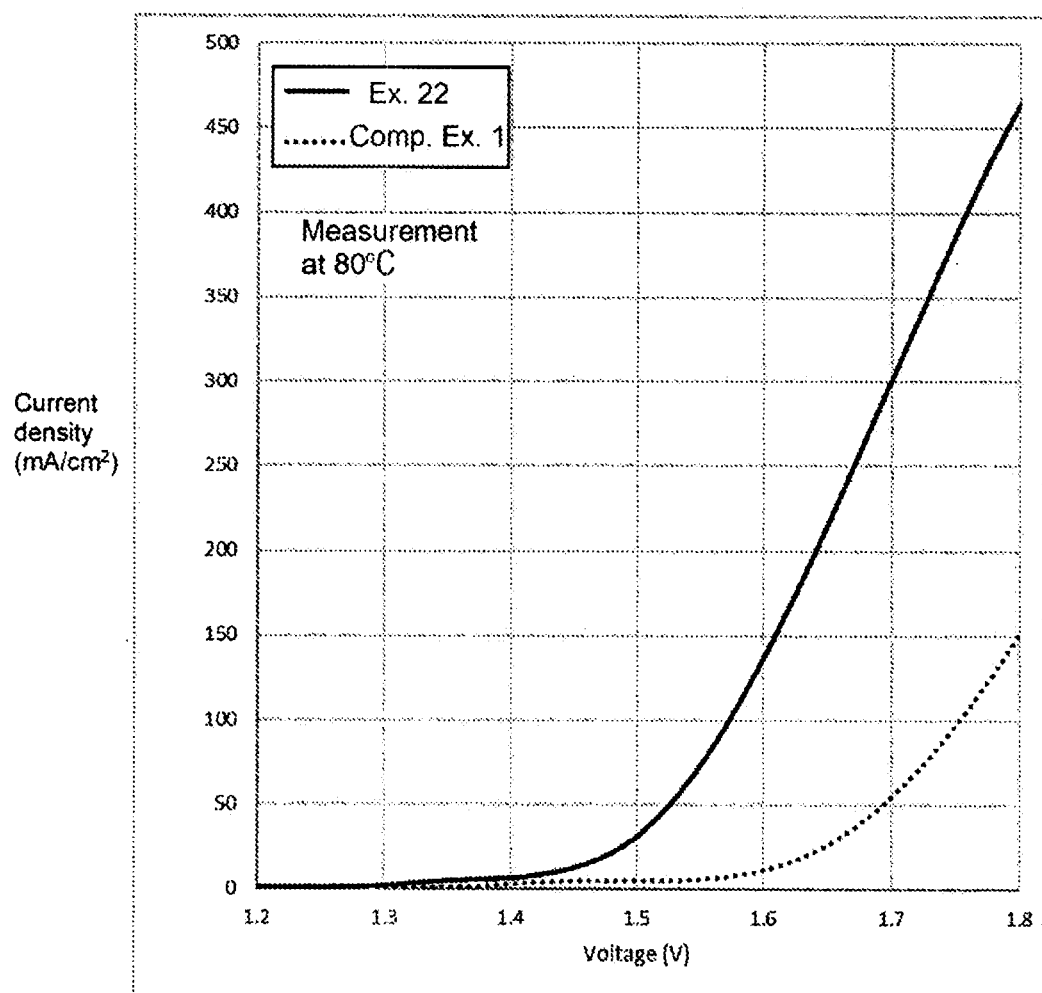
FIG. 9 is linear sweep voltammograms illustrating the relation between the current and the potential (voltage) measured by using <PEM type electrolytic cell 1> at the time of evolution of oxygen (at the time of water electrolysis) in Example 22 and Comparative Example 1.

A PEM type electrolytic cell was constituted by using a commercial iridium oxide catalyst (manufactured by Elyst), and the oxygen evolution electrode catalyst properties were evaluated in accordance with <Electrochemical measurement 1, measurement of current-voltage curve (PEM type electrolytic cell)>, and the results are shown in the following Table 2 and FIG. 5.

Examples 13 to 20

Electrolysis was conducted in an electrolytic cell containing a mixed solution of 2.0 g/L of potassium hexachloroiridate (K$_2$IrCl$_6$) in the same manner as in Example 1 except that the manganese sulfate concentration, the type of the iridium salt, the type of the substrate and the electrolysis temperature were as identified in Table 2, to electrodeposit a manganese-iridium composite oxide on a carbon paper (TGP-H-060, manufactured by Toray Industries, Inc.) or a platinum-covered Ti mesh (ADL-414302-5056, manufactured by FC Development Co., Ltd.). Electrolysis was conducted at an electrolysis current density of 0.7 A/dm$^2$ for 60 minutes. After completion of electrolysis, the carbon paper or the Ti mesh was washed with water, air-dried and cut into a size of 3 cm×3 cm to prepare an electrode material. The electrode material was used to constitute a PEM type electrolytic cell in accordance with <Constitution of PEM type electrolytic cell for evaluation of oxygen evolution electrode catalyst properties>, and the oxygen evolution electrode catalyst properties were evaluated in accordance with <Electrochemical measurement 1, measurement of current-voltage curve (PEM type electrolytic cell 1)> or <Electrochemical measurement 2, measurement of current-voltage curve (PEM type electrolytic cell 2)>. The results are shown in the following Table 2 and FIG. 6.

Examples 21 to 22

Electrolysis was conducted in an electrolytic cell containing a mixed solution of 2.0 g/L of potassium hexachloroiridate (K$_2$IrCl$_6$) in the same manner as in Example 1 except that the manganese sulfate concentration, the type of the iridium salt, the type of the substrate and the electrolysis temperature were as identified in Table 2, to electrodeposit a manganese-iridium composite oxide on a carbon paper (TGP-H-060, manufactured by Toray Industries, Inc.) or a platinum-covered Ti mesh (ADL-414302-5056, manufactured by FC Development Co., Ltd.). Electrolysis was conducted at an electrolysis current density of 0.7 A/dm$^2$ for 60 minutes. After completion of electrolysis, the carbon paper or the Ti mesh was washed with water, air-dried, subjected to annealing treatment at 230° C. for 2 hours, and cut into a size of 3 cm×3 cm to prepare an electrode material. The electrode material was used to constitute a PEM type electrolytic cell in accordance with <Constitution of PEM type electrolytic cell for evaluation of oxygen evolution electrode catalyst properties>, and the oxygen evolution electrode catalyst properties were evaluated in accordance with <Electrochemical measurement 2, measurement of current-voltage curve (PEM type electrolytic cell 2)>. The results are shown in the following Table 2 and FIGS. 7 and 9.

Further, the electrode material in Example 21 was used to constitute a PEM type electrolytic cell in accordance with <Constitution of PEM type electrolytic cell for evaluation of oxygen evolution electrode catalyst properties>, and a change of the electrolysis voltage with time was measured in accordance with <Electrochemical measurement 3, measurement of electrolysis voltage stability (PEM type electrolytic cell 2)>. The results are shown in FIG. 10.

As shown in FIGS. 5 to 9, it was found that the manganese-iridium composite oxide and the manganese-iridium composite oxide electrode material of the present invention have a structure to achieve a high energy conversion efficiency in principle and exhibit high oxygen evolution electrode catalytic activity comparable to commercial iridium oxide catalysts even in a PEM type electrolytic cell for which use of a non-noble metal catalyst has been desired.

Figure 10:
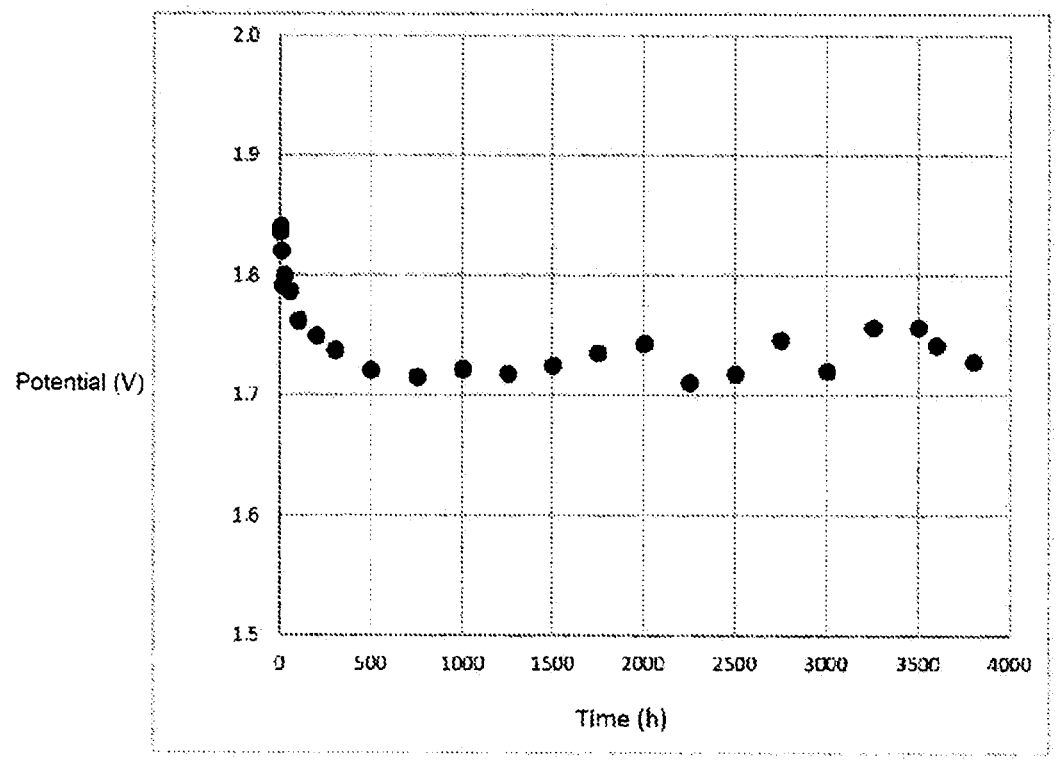
FIG. 10 is data illustrating the electrolysis voltage relative to time measured by using <PEM type electrolytic cell 2> at 80° C. at 0.5 A/cm² at the time of evolution of oxygen (at the time of water electrolysis) in Example 21.

Further, as shown in FIG. 10, it was found that the manganese-iridium composite oxide and the manganese-iridium composite oxide electrode material of the present invention have very excellent durability as an oxygen evolution electrode catalyst.

TABLE 1

| | Electrolysis conditions | | | | | | | |
|---|---|---|---|---|---|---|---|---|
| | Composition of electrolytic solution | | | | | | Current | |
| | $MnSO_4$ (g/L) | $K_2IrCl_6$ (g/L) | $H_2IrCl_6$ (g/L) | $H_2SO_4$ (g/L) | Ir/Mn ratio (Molar ratio) | Temperature (°C.) | density (A/dm2) | Type of substrate |
| Ex. 1 | 51.9 | 2.0 | 0.0 | 35.0 | 0.012 | 95 | 0.7 | CP |
| Ex. 2 | 53.7 | 1.7 | 0.0 | 35.0 | 0.010 | 95 | 0.7 | CP |
| Ex. 3 | 54.8 | 1.5 | 0.0 | 35.0 | 0.009 | 95 | 0.7 | CP |
| Ex. 4 | 54.4 | 0.0 | 1.4 | 35.0 | 0.010 | 94.1 | 0.7 | CP |
| Ex. 5 | 55.0 | 0.0 | 0.7 | 35.0 | 0.005 | 94 | 0.7 | CP |
| Ex. 6 | 55.9 | 2.0 | 0.0 | 35.0 | 0.011 | 94.1 | 0.7 | CP |
| Ex. 7 | 55.9 | 0.0 | 1.2 | 35.0 | 0.008 | 94.1 | 0.7 | CP |
| Ex. 8 | 54.4 | 0.0 | 1.4 | 35.0 | 0.010 | 94.1 | 0.7 | CP |
| Ex. 9 | 62.9 | 0.0 | 0.7 | 35.0 | 0.004 | 94 | 0.7 | CP |
| Ex. 10 | 55.5 | 1.6 | 0.0 | 35.0 | 0.009 | 93.9 | 0.7 | Pt/Ti |
| Ex. 11 | 53.6 | 1.9 | 0.0 | 35.0 | 0.011 | 94.2 | 0.7 | Pt/Ti |
| Ex. 12 | 57.3 | 2.0 | 0.0 | 35.0 | 0.011 | 94.1 | 0.7 | Pt/Ti |
| Comp. Ex. 1 | 75.0 | — | — | 32.0 | — | 95.0 | 0.7 | CP |

| | Properties of deposit | | | | | |
|---|---|---|---|---|---|---|
| | Metal compositional ratio Ir/(Mn + Ir) | Electrodeposition amount | XRD interplanar spacing | | | |
| | atomic % | mg/cm2 | 1st | 2nd | 3rd | 4th |
| Ex. 1 | 10.1 | 8.50 | 2.4286 | 2.1320 | 1.6406 | 1.3999 |
| Ex. 2 | 7.0 | 12.88 | 2.4386 | 2.1400 | 1.6520 | 1.4051 |
| Ex. 3 | 4.8 | 12.95 | 2.4387 | 2.1410 | 1.6521 | 1.4068 |
| Ex. 4 | 0.3 | 12.05 | 2.4256 | 2.1325 | 1.6434 | 1.3966 |
| Ex. 5 | 1.2 | 12.50 | 2.4298 | 2.1361 | 1.6471 | 1.4007 |
| Ex. 6 | 3.5 | 11.20 | 2.4357 | 2.1440 | 1.6507 | 1.4042 |
| Ex. 7 | 2.1 | 11.65 | 2.4308 | 2.1400 | 1.6491 | 1.4031 |
| Ex. 8 | 1.3 | 11.65 | 2.4288 | 2.1357 | 1.6483 | 1.4001 |
| Ex. 9 | 2.6 | 12.40 | 2.4282 | 2.1354 | 1.6475 | 1.3990 |
| Ex. 10 | 2.1 | 12.08 | 2.4326 | 2.1410 | 1.6480 | 1.4030 |
| Ex. 11 | 1.0 | 12.63 | 2.4319 | 2.1379 | 1.6480 | 1.4024 |
| Ex. 12 | 5.9 | 12.68 | 2.4332 | 2.1405 | 1.6523 | 1.4037 |
| Comp. Ex. 1 | 0.0 | 12.93 | 2.4276 | 2.1289 | 1.6361 | 1.3878 |

TABLE 2

| | Electrolysis conditions | | | | | | | |
|---|---|---|---|---|---|---|---|---|
| | Composition of electrolytic solution | | | | | | Current | |
| | $MnSO_4$ (g/L) | $K_2IrCl_6$ (g/L) | $H_2IrCl_6$ (g/L) | $H_2SO_4$ (g/L) | Ir/Mn ratio (Molar ratio) | Temperature (°C.) | density (A/dm2) | Type of substrate |
| Ex. 13 | 52.5 | 1.9 | 0.0 | 35.0 | 0.011 | 95 | 0.7 | CP |
| Ex. 14 | 53.1 | 1.8 | 0.0 | 35.0 | 0.011 | 94.9 | 0.7 | CP |
| Ex. 15 | 54.3 | 1.6 | 0.0 | 35.0 | 0.009 | 95 | 0.7 | CP |

TABLE 2-continued

| | | | | | | | | |
|---|---|---|---|---|---|---|---|---|
| Ex. 16 | 55.4 | 1.5 | 0.0 | 35.0 | 0.008 | 95 | 0.7 | CP |
| Ex. 17 | 54.6 | 0.0 | 1.2 | 35.0 | 0.008 | 94.1 | 0.7 | CP |
| Ex. 18 | 51.3 | 1.7 | 0.0 | 35.0 | 0.010 | 94 | 0.7 | CP |
| Ex. 19 | 54.4 | 0.0 | 1.4 | 35.0 | 0.010 | 94 | 0.7 | CP |
| Ex. 20 | 56.1 | 2.0 | 0.0 | 35.0 | 0.011 | 93.9 | 0.7 | Pt/Ti |
| Ex. 21 | 61.7 | 1.0 | 0.0 | 35.0 | 0.005 | 94.1 | 0.7 | Pt/Ti |
| Ex. 22 | 52.4 | 1.9 | 0.0 | 35.0 | 0.011 | 94.1 | 0.7 | Pt/Ti |
| Comp. Ex. 1 | 75.0 | — | — | 32.0 | — | 95.0 | 0.7 | CP |
| Comp. Ex. 2 | — | — | — | — | — | — | — | — |
| Comp. Ex. 3 | — | — | — | — | — | — | — | — |

| | Electrochemical properties | | | | | |
|---|---|---|---|---|---|---|
| | Characteristic value | | Characteristic value (C. DmA/cm2 on LSV) New Cell | | | |
| | at 1.7 V | at 1.8 V | at 1.7 V | | at 1.8 V | |
| | R.T. | R.T. | R.T. | 80° C. | R.T. | 80° C. |
| Ex. 13 | 49 | 73 | — | — | — | — |
| Ex. 14 | 58 | 85 | — | — | — | — |
| Ex. 15 | 48 | 76 | — | — | — | — |
| Ex. 16 | 43 | 64 | — | — | — | — |
| Ex. 17 | — | — | 99 | — | 152 | — |
| Ex. 18 | — | — | 153 | 570 | 233 | 846 |
| Ex. 19 | — | — | 140 | 444 | 221 | 634 |
| Ex. 20 | — | — | 73 | 292 | 68 | 320 |
| Ex. 21 | — | — | 79 | — | 104 | — |
| Ex. 22 | — | — | 64 | 301 | 115 | 464 |
| Comp. Ex. 1 | 10 | 35 | 8 | 55 | 33 | 150 |
| Comp. Ex. 2 | 2 | 5 | — | — | — | — |
| Comp. Ex. 3 | 50 | 87 | 150 | 720 | 307 | — |

Example 23

Electrolysis was conducted in an electrolytic cell containing a mixed solution of 35 g/L of sulfuric acid, 2.71 g/L of manganese sulfate and 0.48 g/L of potassium hexachloroiridate ($K_2IrCl_6$) to electrodeposit a manganese-iridium composite oxide on a platinum covered Ti mesh (ADL-414302-5056, manufactured by FC Development Co., Ltd.). Electrolysis was conducted at 94° C. at an electrolysis current density of 0.7 A/dm² for 60 minutes. After completion of electrolysis, the Ti mesh was washed with water, air-dried, subjected to heat treatment at 350° C. for 5 hours, and cut into a size of 3 cm×3 cm to prepare an electrode material. Using the obtained electrode material, a PEM type electrolytic cell was constituted in accordance with <Constitution of PEM type electrolytic cell for evaluation of oxygen evolution electrode catalyst properties>, and the oxygen evolution electrode catalyst properties were evaluated in accordance with <Electrochemical measurement 2, measurement of current-voltage curve (using PEM type electrolytic cell 2)>. The results are shown in the following Tables 3, 4 and 5 and FIG. 12.

Example 24

Electrolysis was conducted in an electrolytic cell containing a mixed solution of 35 g/L of sulfuric acid and 54.4 g/L of manganese sulfate at 94° C. at an electrolysis current density of 0.7 A/dm² for 10 minutes to electrodeposit a manganese oxide on a platinum covered Ti mesh (ADL-414302-5056, manufactured by FC Development Co., Ltd.).

Figure 11:
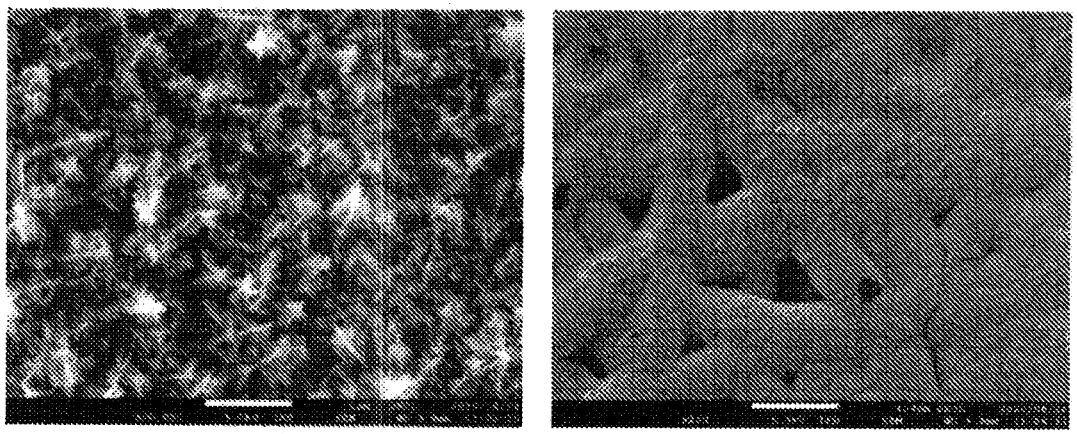
FIG. 11 is a SEM photograph of the manganese-iridium composite oxide deposited on the platinum-covered Ti mesh substrate in Example 24.
Figure 12:
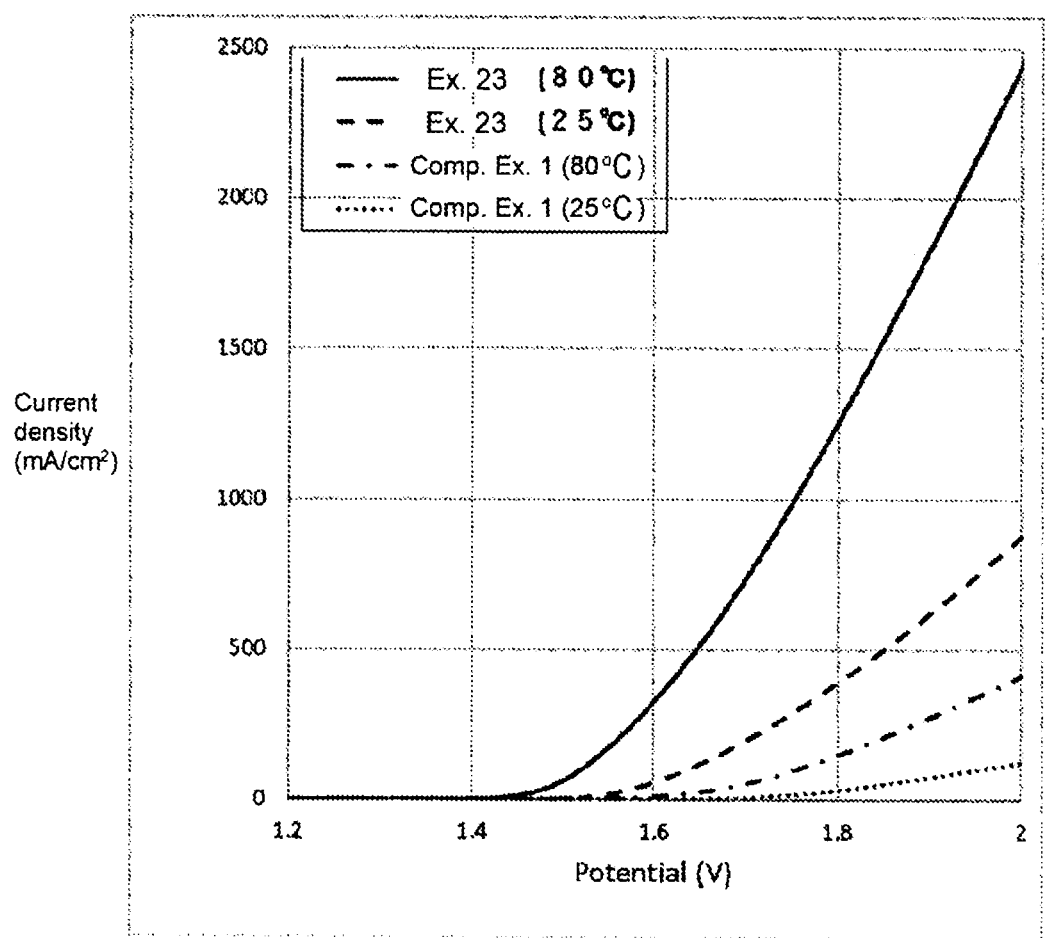
FIG. 12 is linear sweep voltammograms illustrating the relation between the current and the potential (voltage) measured by using <PEM type electrolytic cell 2> at the time of evolution of oxygen (at the time of water electrolysis) in Example 23 and Comparative Example 1.
Figure 13:
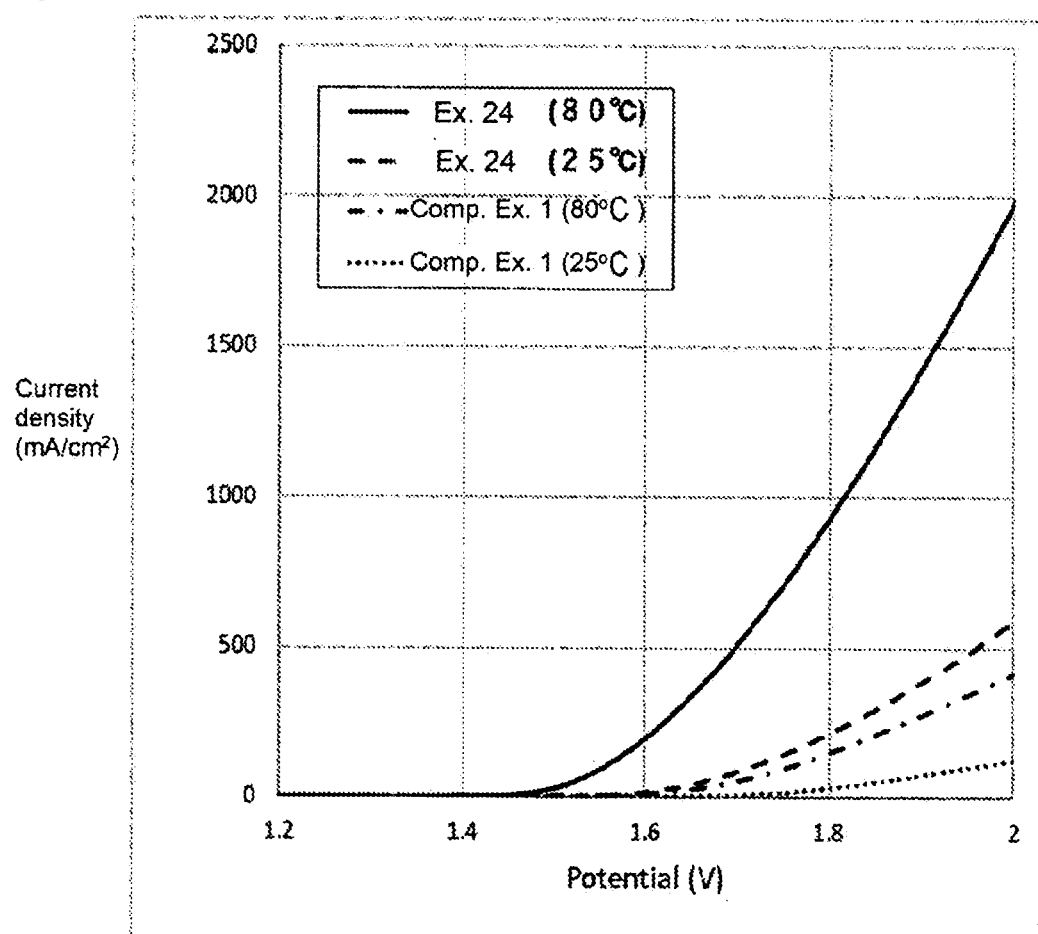
FIG. 13 is linear sweep voltammograms illustrating the relation between the current and the potential (voltage) measured by using <PEM type electrolytic cell 2> at the time of evolution of oxygen (at the time of water electrolysis) in Example 24 and Comparative Example 1.

Then, electrolysis was conducted in an electrolytic cell containing a mixed solution of 35 g/L of sulfuric acid and 0.16 g/L of potassium hexachloroiridate ($K_2IrCl_6$) at 94° C. at an electrolysis current density of 0.7 A/dm² for 60 minutes to electrodeposit an iridium oxide on the manganese oxide. After completion of electrolysis, the Ti mesh was washed with water, air-dried, subjected to heat treatment at 400° C. for 5 hours, and then cut into a size of 3 cm×3 cm to prepare an electrode material. The SEM photograph of the electrode material was shown in FIG. 11. Using the obtained electrode material, a PEM type electrolytic cell was constituted in accordance with <Constitution of PEM type electrolytic cell for evaluation of oxygen evolution electrode catalyst properties>, and the oxygen evolution electrode catalyst properties were evaluated in accordance with <Electrochemical measurement 2, measurement of current-voltage curve (PEM type electrolytic cell 2)>. The results are shown in the following Tables 3, 4 and 5 and FIG. 13.

As shown in Tables 12 and 13, it was found that the manganese-iridium composite oxide and the manganese-iridium composite oxide electrode material of the present invention have a structure to achieve a high energy conversion efficiency in principle, and exhibit particularly excellent oxygen evolution electrode catalytic activity by conducting appropriate heat treatment as a post treatment, and exhibit high oxygen evolution electrode catalytic activity comparable to commercial iridium oxide catalysts even in a PEM type electrolytic cell for which use of a non-noble metal catalyst has been desired.

TABLE 3

Electrolysis condition 1

| | Composition of electrolytic solution | | | | Ir/Mn ratio (Molar ratio) | Temperature (° C.) | Current density (A/dm2) | Time (min) |
|---|---|---|---|---|---|---|---|---|
| | MnSO4 (g/L) | K2IrCl6 (g/L) | H2IrCl6 (g/L) | H2SO4 (g/L) | | | | |
| Ex. 23 | 2.71 | 0.48 | 0.00 | 35.0 | 0.056 | 94 | 0.7 | 60 |
| Ex. 24 | 54.40 | 0.00 | 0.00 | 35.0 | 0.000 | 94 | 0.7 | 10 |

TABLE 4

Electrolysis condition 2

| | Composition of electrolytic solution | | | | | Temperature (° C.) | Current density (A/dm2) | Time (min) | Heat treatment | | |
|---|---|---|---|---|---|---|---|---|---|---|---|
| | MnSO4 (g/L) | K2IrCl6 (g/L) | H2IrCl6 (g/L) | H2SO4 (g/L) | Ir/Mn ratio (Molar ratio) | | | | Temperature (° C.) | Time (min) | Gas |
| Ex. 23 | — | — | — | — | — | — | — | — | 350 | 300 | Air |
| Ex. 24 | 0.00 | 0.16 | 0.00 | 35.0 | 0.000 | 94 | 0.7 | 60 | 400 | 300 | Air |

TABLE 5

| | Properties of deposit | | Characteristic value (C. DmA/cm2 on LSV) | | | |
|---|---|---|---|---|---|---|
| | Metal compositional ratio | | New Cell | | | |
| | Ir/(Mn + Ir) | Total electrodeposition amount | at 1.8 V | | at 2.0 V | |
| | atomic % | mg/cm2 | 25° C. | 80° C. | 25° C. | 80° C. |
| Ex. 23 | 26.30 | 0.38 | 390 | 1253 | 880 | 2447 |
| Ex. 24 | 0.22 | 1.20 | 214 | 926 | 588 | 1980 |

INDUSTRIAL APPLICABILITY

The manganese-iridium composite oxide and the manganese-iridium composite oxide electrode material of the present invention have high oxygen evolution electrode catalytic activity comparable to conventional noble metal type catalysts and accordingly when used as an anode catalyst for oxygen evolution in industrial water electrolysis conducted under alkaline or neutral conditions or in water electrolysis using a PEM type electrolytic cell, they are capable of producing hydrogen and oxygen at very low production costs.

Further, by making carbon dioxide be present in the reaction system e.g. in water electrolysis, the carbon dioxide is reduced at the cathode, whereby hydrocarbon compounds (such as formic acid, formaldehyde, methanol, methane, ethane and propane) may be produced.

The entire disclosure of Japanese Patent Application No. 2020-54589 filed on Mar. 25, 2020 including specification, claims, drawings and summary is incorporated herein by reference in its entirety.

The invention claimed is:

1. A manganese-iridium composite oxide, which has an iridium metal content ratio (iridium/(manganese+iridium)) of 0.1 atomic % or more and 30 atomic % or less, and has interplanar spacings of at least 0.243±0.002 nm, 0.214±0.002 nm, 0.165±0.002 nm and 0.140±0.002 nm.

2. A manganese-iridium composite oxide electrode material comprising an electrically conductive substrate constituted by fibers at least part of which are covered with the manganese-iridium composite oxide as defined in claim 1.

3. The manganese-iridium composite oxide electrode material according to claim 2, wherein the amount of the covering manganese-iridium composite oxide is 0.1 mg/cm$^2$ or more and 25 mg/cm$^2$ or less per geometric area of the electrically conductive substrate.

4. The manganese-iridium composite oxide electrode material according to claim 2, wherein the electrically conductive substrate is constituted by carbon, titanium, or platinum-covered titanium.

5. A laminate comprising the manganese-iridium composite oxide electrode material as defined in claim 2, and a polymer electrolyte membrane.

6. An oxygen evolution electrode active material in water electrolysis, containing the manganese-iridium composite oxide as defined in claim 1.

7. A water electrolysis apparatus, comprising the manganese-iridium composite oxide electrode material as defined in claim 2.

8. A method for producing hydrogen, which comprises conducting water electrolysis using the manganese-iridium composite oxide electrode material as defined in claim 2.

9. An oxygen evolution electrode comprising:
an oxygen evolution electrode active material, the oxygen evolution electrode active material comprising a manganese-iridium composite oxide; wherein
the manganese-iridium composite oxide has
an iridium metal content ratio (iridium/(manganese+iridium)) of 0.1 atomic % or more and 30 atomic % or less, and
interplanar spacings of at least 0.243±0.002 nm, 0.214±0.002 nm, 0.165±0.002 nm and 0.140±0.002 nm.

10. A laminate comprising the oxygen evolution electrode as defined in claim 9, and a polymer electrolyte membrane.

11. A method for producing an manganese-iridium composite oxide electrode material comprising an electrically conductive substrate constituted by fibers at least part of which are covered with the manganese-iridium composite oxide as defined in claim 1, which comprises electrodepositing the manganese-iridium composite oxide on the fibers constituting the electrically conductive substrate by electrolysis of a mixed solution containing sulfuric acid/manganese sulfate/iridium salt.

12. The method for producing the manganese-iridium composite oxide electrode material according to claim 11, wherein a heat treatment is conducted.

13. The method for producing the manganese-iridium composite oxide electrode material according to claim 12, wherein the heat treatment is conducted at from 180° C. to 500° C. for from 30 minutes to 8 hours.

14. The production method according to claim 11, wherein the manganese-iridium composite oxide is electrodeposited in a deposition amount of from 0.1 mg/cm$^2$ or more and 25 mg/cm$^2$ or less per geometric area.

15. A method for producing an manganese-iridium composite oxide electrode material comprising an electrically conductive substrate constituted by fibers at least part of which are covered with the manganese-iridium composite oxide as defined in claim 1, which comprises covering the fibers constituting the electrically conductive substrate with the manganese-iridium composite oxide by electrolysis with a sulfuric acid/manganese sulfate mixed solution and then by electrolysis with a mixed solution containing sulfuric acid/iridium salt.

* * * * *